United States Patent
Akimoto et al.

(10) Patent No.: US 9,347,501 B2
(45) Date of Patent: May 24, 2016

(54) DRIVE POWER TRANSMISSION SYSTEM

(71) Applicant: Nissan Motor Co., Ltd., Yokohama, Kanagawa (JP)

(72) Inventors: Tatsuya Akimoto, Ebina (JP); Shigeru Ishii, Atsugi (JP); Tsuyoshi Yamanaka, Hiroshima (JP); Tomoharu Fujii, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 43 days.

(21) Appl. No.: 14/351,164

(22) PCT Filed: Oct. 11, 2012

(86) PCT No.: PCT/JP2012/076276
§ 371 (c)(1),
(2) Date: Apr. 11, 2014

(87) PCT Pub. No.: WO2013/054827
PCT Pub. Date: Apr. 18, 2013

(65) Prior Publication Data
US 2014/0284164 A1  Sep. 25, 2014

(30) Foreign Application Priority Data

Oct. 12, 2011  (JP) .................................. 2011-224625

(51) Int. Cl.
*F16D 25/08* (2006.01)
*F16D 25/12* (2006.01)
(Continued)

(52) U.S. Cl.
CPC .............. *F16D 25/123* (2013.01); *F16D 13/52* (2013.01); *F16D 13/648* (2013.01); *F16D 25/0638* (2013.01); *F16D 25/083* (2013.01); *F16D 2300/0212* (2013.01); *F16D 2300/26* (2013.01)

(58) Field of Classification Search
CPC ................................................ F16D 2300/0212
USPC ........................................ 192/113.23, 113.26
See application file for complete search history.

(56) References Cited

U.S. PATENT DOCUMENTS 1,635,353 A * 7/1927 Alley ........................ 192/113.23
3,945,476 A * 3/1976 de Jong ....................... 192/12 D
(Continued)

FOREIGN PATENT DOCUMENTS

JP    2-146252 A    12/1990
JP    7-71477 A     3/1995
(Continued)

OTHER PUBLICATIONS

An English translation of the Japanese Office Action for the corresponding Japanese patent application No. 2013-538560 issued on Sep. 24, 2014.

*Primary Examiner* — Richard Lorence
(74) *Attorney, Agent, or Firm* — Global IP Counselors, LLP

(57) ABSTRACT

A drive power transmission system includes a clutch hub, a clutch drum and a dry clutch. The dry clutch includes first and second clutch plates, a friction facing and a cover member. The first clutch plate is joined to the clutch hub. The second clutch plate is joined to the clutch drum. The cover member has an external air intake hole and an external air discharge hole. These holes of the cover member are positioned such that, due to rotation of at least one of the clutch hub and the clutch drum, an air flow is generated that draws external air is through the external air intake hole and along the clutch hub to a radially inward location of reduced air pressure, then passes radially outward to a radially outward location of increased air pressure, and then passes along the clutch drum and out the external air discharge hole.

16 Claims, 7 Drawing Sheets

(51) Int. Cl.
  *F16D 13/72* (2006.01)
  *F16D 13/52* (2006.01)
  *F16D 13/64* (2006.01)
  *F16D 25/0638* (2006.01)

(56) References Cited

U.S. PATENT DOCUMENTS 4,646,902 A * 3/1987 Maruyamano et al. .. 192/113.23
9,080,612 B2 * 7/2015 Fujii et al.
2010/0072020 A1 * 3/2010 Cimatti .................... 192/113.35

FOREIGN PATENT DOCUMENTS

| JP | 2001-165195 A | 6/2001 | |
|---|---|---|---|
| JP | 2006-275085 A | 10/2006 | |
| JP | 2010-38237 A | 2/2010 | |
| JP | 2010-151313 A | 7/2010 | |
| JP | 2010-242824 A | 10/2010 | |
| WO | WO 2012/029441 A1 * | 3/2012 | ............. F16D 13/60 |

* cited by examiner

DRIVE POWER TRANSMISSION SYSTEM

CROSS-REFERENCE TO RELATED APPLICATIONS

This application is a U.S. National stage application of International Application No. PCT/JP2012/076276, filed Oct. 11, 2012, which claims priority to Japanese Patent Application No. 2011-224625 filed in Japan on Oct. 12, 2011.

BACKGROUND

1. Field of the Invention

The present invention relates to a drive power transmission system that is suitable for automobile drive systems in which a dry clutch that disconnects the transmitting of drive power is installed in a sealed space.

2. Background Information

In the past, hybrid drive power transmission systems have been known in which the engine, the motor and clutch unit, and the accelerator unit are in a linked connection. With the motor and clutch unit, a dry multi-plate clutch is disposed inside the electric motor. Specifically, a clutch hub that is linked to the output shaft of the engine, a clutch drum to which a rotor of an electric motor is fixed, and which is linked to the input shaft of the transmission, and a dry multi-plate clutch that is interposed between the clutch hub and clutch drum are provided (e.g., refer to Japanese Laid-Open Patent Application No. 2010-151313).

SUMMARY

However, with conventional hybrid drive power transmission systems, a dry multi-plate clutch is housed in a dry space that is covered by a unit housing and sealed by a sealing member. For this reason, abrasion dust from the friction facing that is produced with repeated engagement and release of the clutch is not discharged and poor engagement and release of the dry multi-plate clutch arises as a result dragging due to the abrasion dust that has accumulated between the friction surfaces. The electric motor or clutch is thus disposed in the radial direction of the dry multi-plate clutch, and there is no space to provide abrasion dust discharge openings. There has thus been the problem that abrasion dust cannot be discharged radially.

The present invention focuses on the above problem, it being an object of the invention to provide a drive power transmission system whereby abrasion dust that is generated between clutch plates that are pressed together via a friction facing can escape outwards by being carried in an axial air flow.

In order to achieve the above objective, the present invention is a drive power transmission system in which a dry clutch that disconnects the transmitting of drive power is disposed in a sealed space. The dry clutch has a first clutch plate, a second clutch plate, a friction facing, and a cover member. The first clutch plate is joined by splines with a clutch hub. The second clutch plate is joined by splines with a clutch drum. The friction facing is provided on one of the first and second clutch plates, and a friction surface presses against the other plate face during clutch engagement. The cover member has an external air intake hole through which external air is taken into the sealed space and an external air discharge hole through which air flow is discharged from inside the sealed space to external air. The external air intake hole is provided so that the cover member disposed on a side face of the dry clutch is axially passed through radially inwardly from the two clutch plates. The external air discharge hole is provided so that the cover member disposed on a side face of the dry clutch is axially passed through radially outwardly from the two clutch plates.

As described above, the cover member that is disposed on a side face of the dry clutch has an external air intake hole through which external air is taken into the sealed space and an external air discharge hole through which an air flow from the sealed space is discharged into external air. A configuration is adopted in which the external air intake hole is provided radially inwardly from the two clutch plates, and the external air discharge hole is provided radially outwardly from the two clutch plates. For this reason, as a result of the effect of centrifugal pressure from rotation about the clutch rotational axis, the radially inward pressure of the dry clutch is lower than atmosphere pressure (negative pressure), and the radially outward pressure of the dry clutch is higher than atmospheric pressure (positive pressure), thereby producing a pressure relationship in which the radially-outward clutch air pressure is greater than atmospheric pressure, which is greater than the radially-inward clutch air pressure. Consequently, the external air which is at atmospheric pressure is drawn in under negative pressure, moves from the external air intake hole radially inward in the clutch, and then moves under centrifugal pressure from the a radially inward location in the clutch towards a radially outward location. The air is then discharged under positive pressure from the circumference of the clutch towards the external air discharge hole before being discharged into the external air from the external air discharge hole. As a result of this external air transfer action, an air flow is generated that is delineated by a flow line running as follows: external air→external air intake hole→axial gaps radially inward in the clutch→radial gaps of the clutch→axial gaps radially outward in the clutch→external air discharge hole→external air. For this reason, abrasion dust that has been released from the surface of the friction facing is transferred by being carried along by a series of air flows resulting from the axial intake air flow, the radial air flow and the axial discharge air flow, thereby being externally discharged. As a result, the abrasion dust that arises between the clutch plates that are pressed together via friction facing can be externally discharged by being carried by a radial air flow.

BRIEF DESCRIPTION OF THE DRAWINGS

Referring now to the attached drawings which form a part of this original disclosure.

DETAILED DESCRIPTION OF THE EMBODIMENTS

Figure 1:
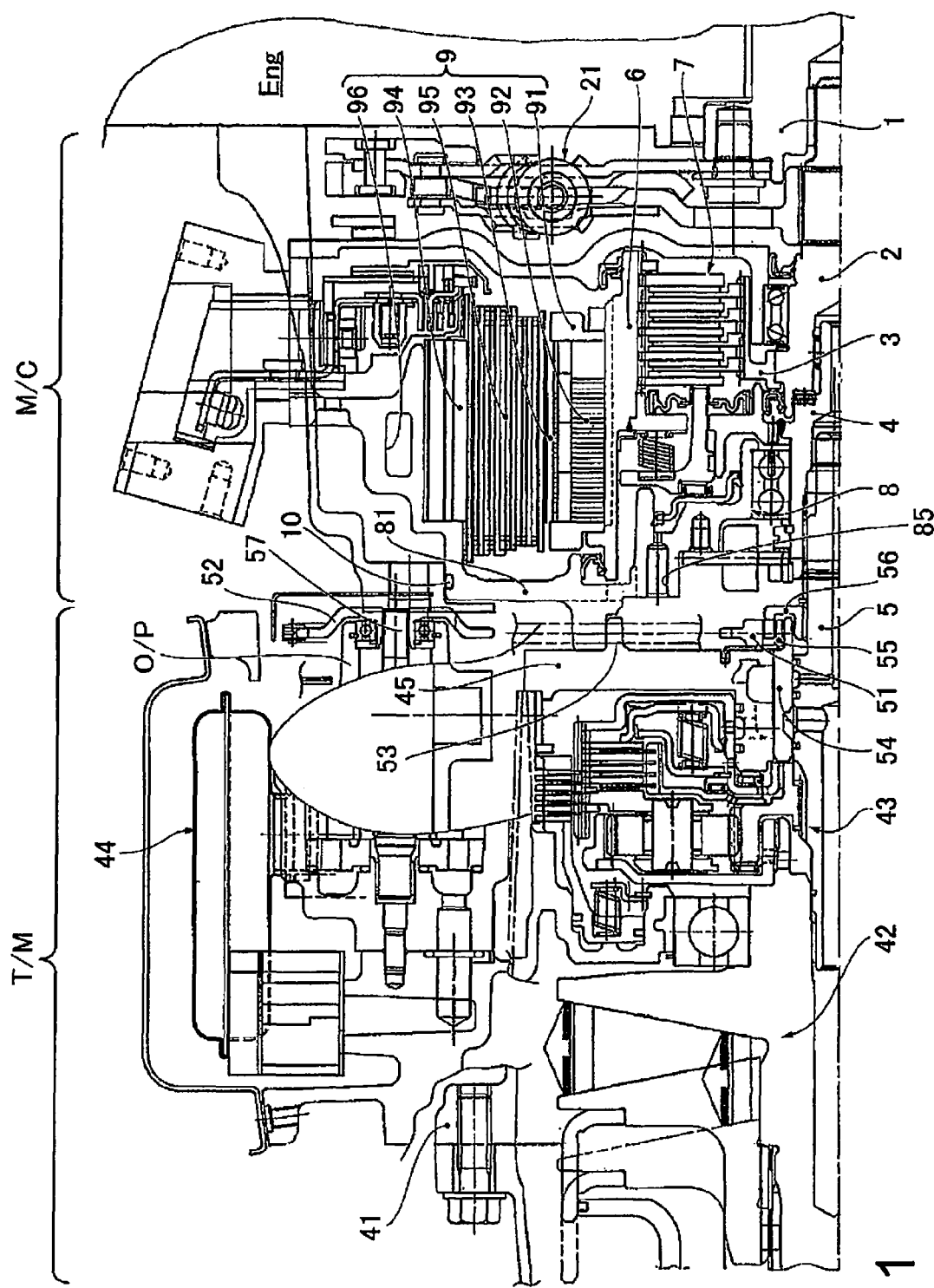
FIG. 1 is a schematic diagram showing the hybrid drive power transmission system of a first embodiment (example of the drive power transmission system)

A preferred embodiment of the drive power transmission system of the present invention is described below based on the first embodiment shown in the drawings.
The First Embodiment
First, the configuration will be described. The configuration of the hybrid drive power transmission system of the first embodiment is described below under the headings: General configuration, Motor and clutch unit configuration, Dry multi-plate clutch configuration, and Air flow effect abrasion dust discharge configuration.

General Configuration

FIG. 1 is a general schematic diagram showing the hybrid drive power transmission system of the first embodiment (example of drive power transmission system). The general configuration of the device is described below with reference to FIG. 1.

The hybrid drive power transmission system of the first embodiment, as shown in FIG. 1, comprises an engine Eng, a motor and clutch unit M/C, an transmission unit T/M, an engine output shaft 1, a clutch hub shaft 2, a clutch hub 3, a clutch drum shaft 4, a transmission input shaft 5, a clutch drum 6, a dry multi-plate clutch 7 (dry clutch), a slave cylinder 8, and a motor/generator 9. The slave cylinder 8 that controls oil pressure that engages and releases the dry multi-plate clutch 7 is generally referred to as a "concentric slave cylinder" (CSC).

With the hybrid drive power transmission system of the first embodiment, when the dry multi-plate clutch 7 that is normally open is released, the motor/generator 9 and transmission input shaft 5 are linked by the clutch drum 6 and the clutch drum shaft 4, producing an "electric driving mode." Next, the dry multi-plate clutch 7 is made to engage under hydraulic pressure from the slave cylinder 8, the engine Eng and motor/generator 9, and the engine output shaft 1 and clutch hub shaft 2 are linked via a damper 21. Next, linkage occurs via the dry multi-plate clutch 7 in which the clutch hub 3 and clutch drum 6 are engaged, producing a "hybrid driving mode."

The motor and clutch unit M/C has a dry multi-plate clutch 7, a slave cylinder 8, and a motor/generator 9. The dry multi-plate clutch 7 is linked and connected to the engine Eng and disconnects the transmitting of drive power from the engine Eng. The slave cylinder 8 controls the oil pressure for engaging and releasing the dry multi-plate clutch 7. The motor/generator 9 is disposed at an outer circumferential location on the clutch drum 6 of the dry multi-plate clutch 7 and transfers power to the transmission input shaft 5. A cylinder housing 81 that has a first clutch hydraulic path 85 is provided on the slave cylinder 8, with a seal maintained by an O-ring 10.

The motor/generator 9 has a rotor support frame 91 that is integrated with the clutch drum 6 and a rotor 92 enclosing a permanent magnet that is fixed and supported on the rotor support frame 91. Next, there is a stator 94 that is fixed on the cylinder housing 81 and is disposed at the rotor 92 with an air gap 93 interposed, and a stator coil 95 that is wound around the stator 94. A water jacket 96 that allows flow of cooling water is formed in the cylinder housing 81.

The transmission unit T/M is linked and connected to the motor and clutch unit M/C and has a transmission housing 41, a V-belt stepless transmission mechanism 42, and an oil pump O/P. The V-belt stepless transmission mechanism 42 is housed in the transmission housing 41, with the V-belt suspended between two pulleys, providing a stepless variable gear ratio by varying the belt contact diameter. The oil pump O/P is a hydraulic oil source that provides hydraulic pressure to the required components. With the oil pump pressure as the source pressure, hydraulic pressure is conducted to the required components from a control valve not shown in the drawings that modulates the pressure, e.g., the transmission hydraulic pressure, that is provided to the pulley chamber or the clutch/brake hydraulic pressure. This transmission unit T/M also has a forward/reverse switching mechanism 43, an oil tank 44, and an end plate 45. The end plate 45 has a second clutch hydraulic path 47 (FIG. 2).

The oil pump O/P is driven as a result of transfer of rotational drive torque from the transmission input shaft 5 via a chain drive mechanism. The chain drive mechanism has a drive-side sprocket 51 that rotates along with rotational drive of the transmission input shaft 5, a driven-side sprocket 52 that rotationally drives a pump shaft 57, and a chain 53 that is suspended on both sprockets 51, 52. The drive-side sprocket 51 is mounted between the transmission input shaft 5 and an end plate 45 and is rotatably supported via a brush 55 on a stator shaft 54 that is fixed to the transmission housing 41. Thus, splined joining occurs with the transmission input shaft 5, and rotational drive torque from the transmission input shaft 5 is transmitted via a first adaptor 56 that fits via teeth on the drive-side sprocket 51.

Motor and Clutch Unit Configuration

Figure 2:
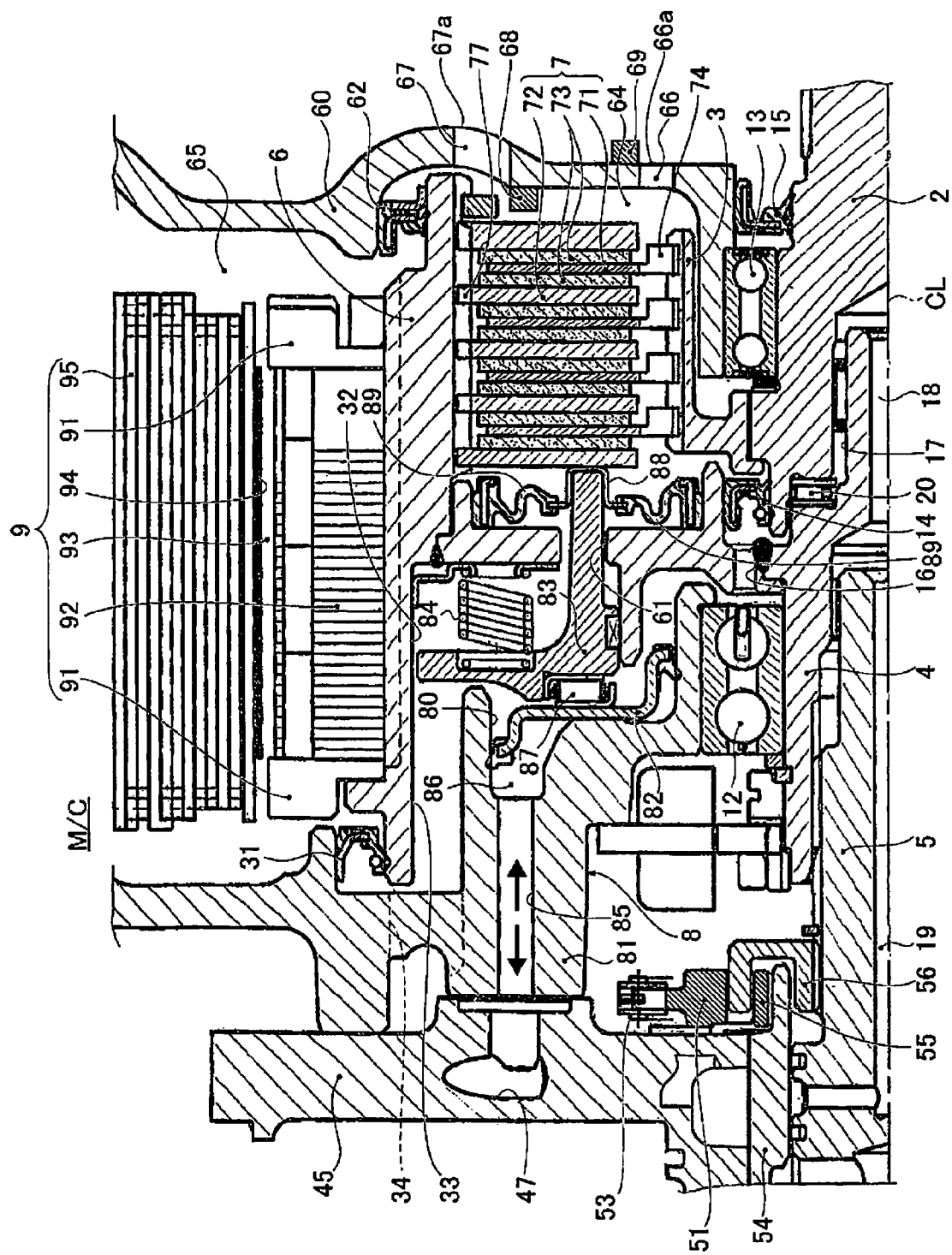
FIG. 2 is a cross-sectional view showing the configuration of the motor and the clutch unit in the hybrid drive power transmission system of the first embodiment.
Figure 3:
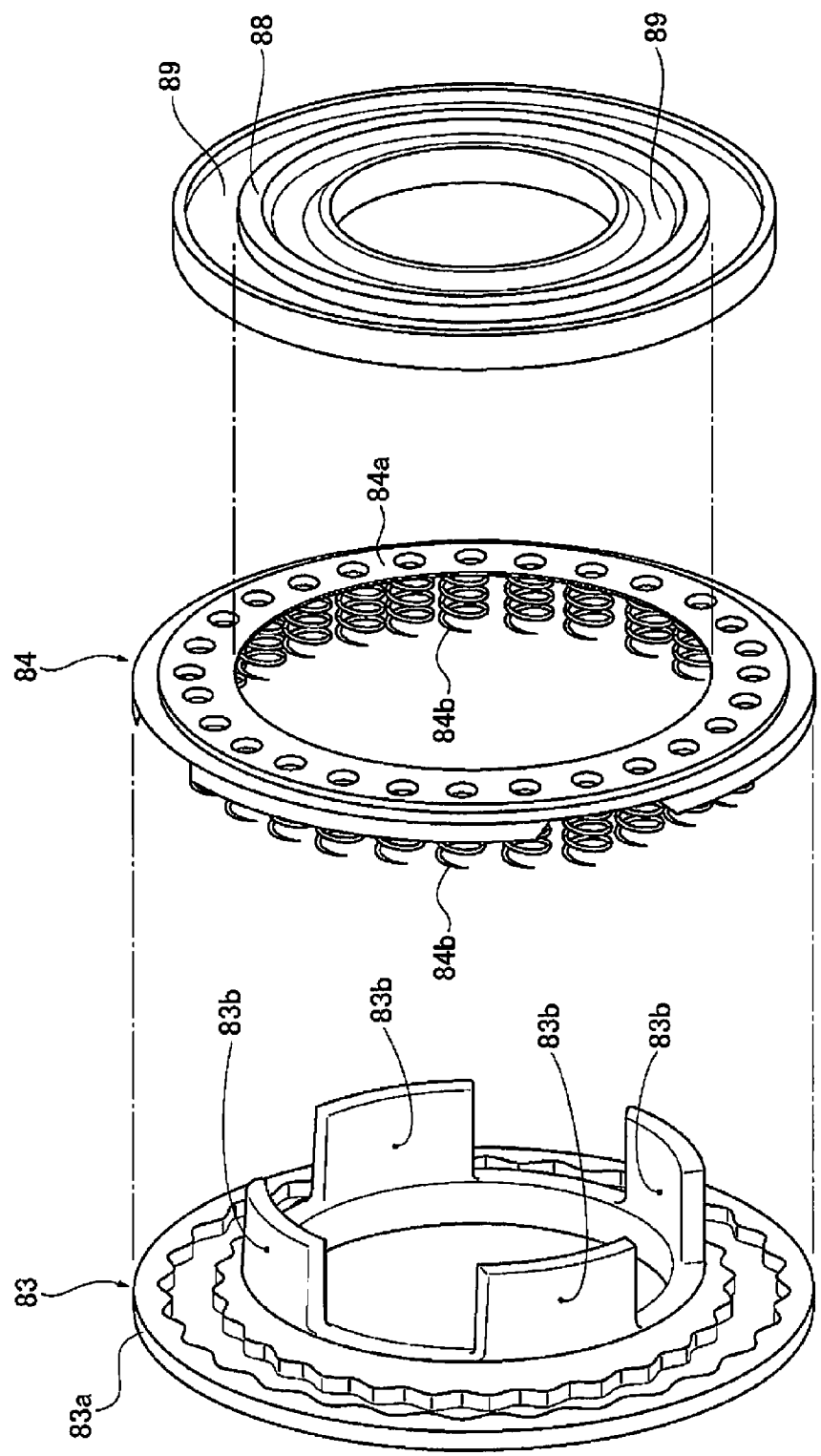
FIG. 3 is an exploded perspective view showing the piston assembly of the dry multi-plate clutch in the hybrid drive power transmission system of the first embodiment.

FIG. 2 is a specific sectional view showing the configuration of the motor and clutch unit in the hybrid drive power transmission system of the first embodiment. FIG. 3 is an exploded oblique view of the piston assembly of the dry multi-plate clutch in the hybrid drive power transmission system of the first embodiment. The configuration of the motor and clutch unit M/C is described below with reference to FIGS. 2 and 3.

The clutch hub 3 is linked to the engine output shaft 1 of the engine Eng. As shown in FIG. 2, in the clutch hub 3, a drive plate 71 (first clutch plate) of the dry multi-plate clutch 7 is held by splined joining.

The clutch drum 6 is linked to the transmission input shaft 5 of the transmission unit T/M. As shown in FIG. 2, a driven plate 72 (second clutch plate) of the dry multi-plate clutch 7 is held by splined joining on this clutch drum 6.

With the dry multi-plate clutch 7, the drive plate 71 and the driven plate 72 to which friction facings 73, 73 are adhered on both surfaces are interposed alternately between the clutch hub 3 and the clutch drum 6 so that they are aligned in multiple plates. In other words, by engagement of the dry multi-plate clutch 7, torque transfer between the clutch hub 3 and the clutch drum 6 is enabled, and by release of the dry multi-plate clutch 7, torque transfer between the clutch hub 3 and the clutch drum 6 is disconnected.

The slave cylinder 8 is a hydraulic pressure actuator that controls engagement and release of the dry multi-plate clutch 7 and is disposed at a location that is between the transmission unit T/M and the clutch drum 6. As shown in FIG. 2, the slave cylinder 8 has a piston 82 that is slidably provided in a cylinder hole 80 of the cylinder housing 81, a first clutch hydraulic path 85 that is formed in the cylinder housing 81 and conducts clutch pressure output by the transmission unit T/M, and a cylinder oil housing 86 that communicates with the first clutch hydraulic path 85. As shown in FIG. 2, a needle bearing 87, a piston arm 83, a return spring 84, and an arm press-plate 88 are interposed between the piston 82 and the dry multi-plate clutch 7.

The piston arm 83 generates press force for the dry multi-plate clutch 7 as a result of the press force from the slave cylinder 8, and the piston arm is slidably provided in a through-hole 61 formed in the clutch drum 6. The return spring 84 is interposed between the piston arm 83 and the clutch drum 6. The needle bearing 87 is interposed between the piston 82 and the piston arm 83, and the piston 82 suppresses inducement of rotation that occurs along with rotation of the piston arm 83. The arm press-plate 88 is provided integrally with elastic bellows-shaped support members 89, 89, and an inner circumferential part and outer circumferential part of the elastic bellows-shaped support members 89, 89 are pressed in and fixed on the clutch drum 6. Influx of oil leaking from the piston arm 83 into the dry multi-plate clutch 7 is blocked by the arm press-plate 88 and the elastic cornice-shaped support members 89, 89. In other words, the elastic bellows-shaped support member 89 and the arm press-plate 88 that is sealed and fixed at the piston arm attachment location of the clutch drum 6 have a partitioning function that produces a wet space in which the slave cylinder 8 is disposed and a dry space in which the dry multi-plate clutch 7 is disposed.

As shown in FIG. 3, the piston arm 83 comprises an arm body 83a that is formed in the shape of a ring and arm protrusion ridges 83b that protrude from the arm body 83a in four locations.

As shown in FIG. 3, the return spring 84 comprises a spring support plate 84a that is formed in the shape of a ring, and multiple coil springs 84b that are fixed on the spring support plate 84a.

As shown in FIG. 2, the arm press-plate 88 is pressed and fixed on the arm protrusion ridges 83b of the piston arm 83. As shown in FIG. 3, the bellows-shaped elastic support members 89, 89 are present integrally on the inside and outside of the arm press-plate 88.

The leak oil recovery path in the first embodiment, as shown in FIG. 2, comprises a first bearing 12, a first seal member 31, a leak oil path 32, a first recovery oil path 33, and a second recovery oil path 34. Specifically, the path is a circuit whereby leak oil from the sliding part of the piston 82 passes through the first recovery oil path 33 and the second recovery oil path 34 that are sealed by a first seal member 31 and then returns to the transmission unit T/M. In addition, the path is a circuit whereby leak oil from the sliding part of the piston arm 83 passes through the leak oil path 32 that is sealed by the partitioning elastic members (arm press-plate 88, bellows-shaped elastic support members 89, 89) and the first recovery oil path 33 and second recovery oil path 34 that are sealed by the first seal member 31 and then returns to the transmission unit T/M.

The bearing lubricating oil path of the first embodiment, as shown in FIG. 2, comprises a needle bearing 20, a second seal member 14, a first shaft core oil path 19, a second shaft core oil path 18, a lubricating oil path 16, and a gap 17. This bearing lubricating oil path effects bearing lubrication through a route whereby the bearing lubricating oil from the transmission unit T/M passes through the needle bearing 20, the first bearing 12 that rotatably support the clutch drum 6 on the cylinder housing 81, and the needle bearing 87 that is interposed between the piston 82 and the piston arm 83, and then returns to the transmission unit T/M.

The second sealing member 14, as shown in FIG. 2, is interposed between the clutch hub 3 and the clutch drum 6. This second sealing member 14 seals inflow of bearing lubrication oil from the wet space in which the slave cylinder 8 is disposed to the dry space in which the dry multi-plate clutch 7 is disposed.

Dry Multi-Plate Clutch Configuration

Figure 4:
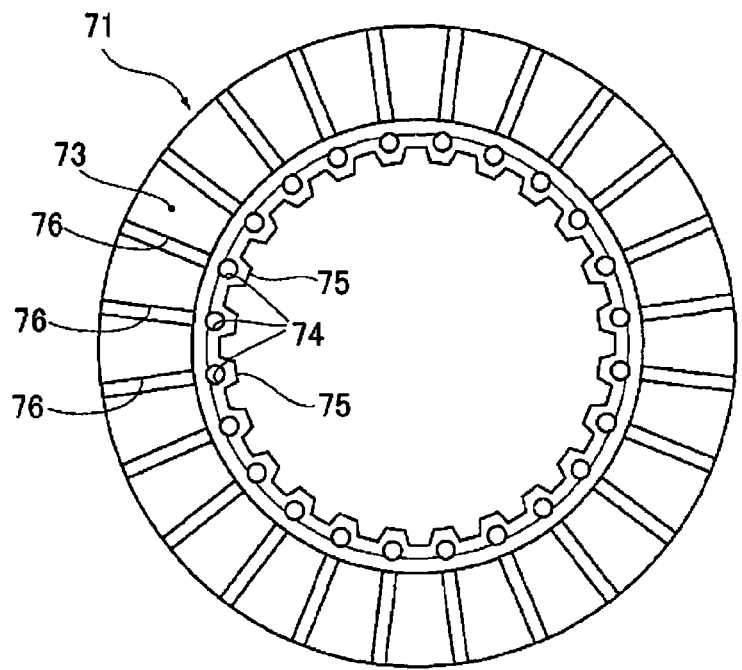
FIG. 4 is a plan view showing the drive plate of the dry multi-plate clutch device in the hybrid drive power transmission system of the first embodiment.
Figures 5A, 5B:
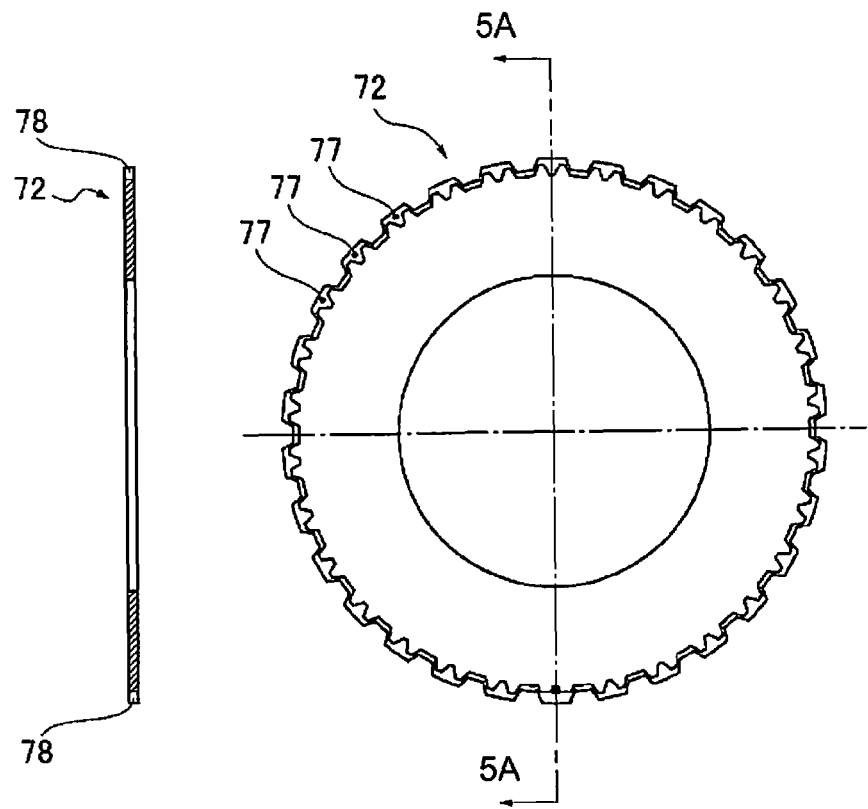
FIG. 5A is a cross-sectional view of the drive plate of the dry multi-plate clutch in the hybrid drive power transmission system of the first embodiment as seen along section line 5A-5A of FIG. 5B.
FIG. 5B is a plan view of the drive plate of the dry multi-plate clutch for the dry multi-plate clutch in the hybrid drive power transmission system of the first embodiment.
Figure 6:
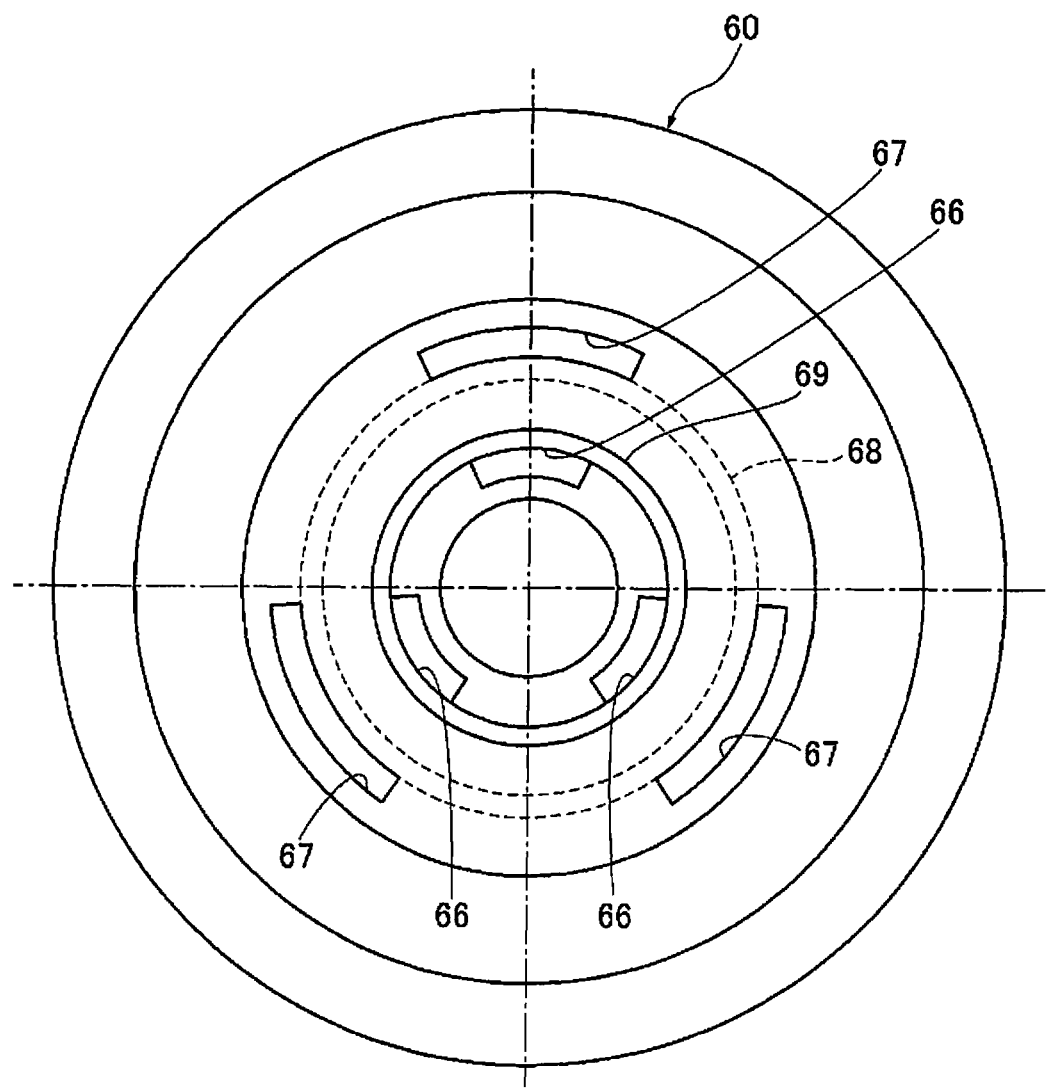
FIG. 6 is a side view showing the front cover of the dry multi-plate clutch in the hybrid drive power transmission system of the first embodiment.

FIGS. 4 to 6 are diagrams showing the configurational elements of the dry multi-plate clutch 7. The configuration of the dry multi-plate clutch 7 is described with reference to FIG. 2 and FIGS. 4 to 6.

The dry multi-plate clutch 7 is a clutch that connects and disconnects drive power from the engine Eng and is disposed, as shown in FIG. 2, in a clutch chamber 64 formed as a sealed space enclosed by the clutch hub shaft 2, the clutch hub 3, the clutch cover 6, and a front cover 60. Thus, the configurational elements of the dry multi-plate clutch 7 comprise the drive plate 71 (first clutch plate), the driven plate 72 (second clutch plate), the friction facing 73, and the front cover 60 (cover member).

The drive plate 71 is joined by splines to the clutch hub 3 and has air passage holes 74 whereby an air flow passes through in the axial direction at the splined joining parts with the clutch hub 3. In the spline teeth that mesh with the spline parts of the clutch hub 3, as shown in FIG. 4, the drive plate 71 has air passage holes 74 at locations on spline tooth protrusions 75 that protrude radially inward at locations that are inwards from the facing grooves 76 that are formed in the friction facing 73. Thus, the drive plate 71, as shown in FIG. 2, is provided so that the air passage holes 74 of the multiple plates (four plates in the first embodiment) are in communication in the axial direction.

The driven plate 72 is joined by splines to the clutch drum 6 and has air passage gaps 77 that allow an air flow to flow in the axial direction in the splined joining parts with the clutch drum 6. As shown in FIG. 6, depressions 78 are formed in the center locations of the spline teeth protrusions that protrude radially outward, and the air passage gaps 77 are provided as gap spaces that are open when joining with the spline teeth of the clutch drum 6 has been brought about.

The friction facing 73 is provided on both faces of the drive plate 71, and the friction surfaces are pressed against the plate faces of the driven plates 72 when the clutch is engaged. The friction facing 73, as shown in FIG. 5, is a ring-shaped plate member having facing grooves 76 that are formed as straight radial lines extending radially from an inner location to an outer location. The facing grooves 76 have a depth whereby the groove shape is retained even when abrasion of the facing has progressed to some degree.

The front cover 60 is integrally fixed on the cylinder housing 81 of the static member that is supported by the first bearing 12 on the clutch drive shaft 4 and covers the motor/generator 9 and the dry multi-plate clutch 7. In other words, the front cover 60 is a static member that is sealed by a cover seal 15 while being supported by a second bearing 13 on the clutch hub shaft 2. In the internal space that is formed as a result of being covered by the front cover 60 and the cylinder housing 81, the space that is towards the clutch rotational shaft CL (=rotor shaft) is used for the clutch chamber 64 that houses the dry multi-plate clutch 7, and the outer space of the clutch chamber 64 is used for a motor chamber 65 that houses the motor/generator 9. Thus, the clutch chamber 64 and the motor chamber 65 that are separated by a dust sealing member 62 are dry spaces that block ingress of oil.

Abrasion Dust Discharge Configuration Resulting from Air Flow Effects

The dry multi-plate clutch 7 abrasion dust discharge configuration resulting from air flow effects is described below with reference to FIG. 2 and FIGS. 4 to 6.

The abrasion dust discharge configuration in the dry multi-plate clutch 7 that is produced as a result of air flow effects comprises the air passage holes 74, the air passage gaps 77, and the facing grooves 76.

The air passage holes 74 are formed in the drive plates 71, the clutch hub 3, and the splined joining parts, allowing an air flow to pass in the axial direction (FIG. 4)

The air passage gaps 77 are formed in the driven plates 72, the clutch drum 6, and the splined joining parts, allowing an air flow to pass in the axial direction (FIG. 5).

The facing grooves 76 are formed as straight radial lines extending radially from an inner location to an outer location in the friction facing 73, allowing air flow to pass in the radial direction (FIG. 4).

As shown in FIG. 2 and FIG. 6, the abrasion dust discharge configuration of the front cover 60 produced as a result of air flow effects comprises an external air intake hole 66, an external air discharge hole 67, a separator inner wall 68 (inner wall structure), and a separator outer wall 69 (outer wall structure).

The external air intake hole 66 is a hole that takes external air into the clutch chamber 64 formed as a sealed space. As shown in FIG. 2, the external air intake hole 66 is provided in the front cover 60 (which is disposed adjacent to the side face of the dry multi-plate clutch 7) so as to pass through the front cover 60 in the axial direction and open toward a radially inward portion of the dry multi-plate clutch 7. The specific radial location in which the external air intake hole 66 is provided aligns with the radial location on the dry multi-plate clutch 7 at which the air passage holes 74 that allow an air flow to move in the axial direction are provided. Thus, as shown in FIG. 6, three divided arcs formed in the front cover 60 constitute the external air intake holes 66.

The external air discharge hole 67 is a hole that allows external discharge of air flow from inside the clutch chamber 64 formed as a sealed space. As shown in FIG. 2, the external air discharge hole 67 is provided in the front cover 60 so as to pass through the front cover 60 in the axial direction and open toward a radially outward portion of the dry multi-plate clutch 7. The location where the external air discharge hole 67 is provided in the radial direction aligns with the radial location on the dry multi-plate clutch 7 at which the air passage gaps 77 that allow air flow to pass in the axial direction are provided. Thus, as shown in FIG. 6, three divided arcs that are formed in the front cover 60 producing holes that have a larger opening surface area than the external air intake holes 66 constitute the external air discharge holes 67.

The separator inner wall 68 suppresses movement of air flow from inside the external air discharge hole 67 towards the interior of the external air intake hole 66 and is formed in the front cover 60 at a radial location on the inner face between the external air intake hole 66 and the external air discharge hole 67. The separator inner wall 68 in the first embodiment, as shown in FIGS. 2 and 6, is a donut-shaped protrusion that is provided at a location on the inner face of the front cover 60 so that it surrounds the middle clutch hub shaft 2.

The separator external wall 69 suppresses air flow from outside the external air discharge hole 67 to outside the external air intake hole 66 and is provided at a radial location on the external wall of the front cover 60 between the external air discharge hole 67 and the external air intake hole 66. The separator external wall 69 in the first embodiment, as shown in FIGS. 2 and 6, is a donut-shaped protrusion that is provided at a location on the outside of the front cover 60 so that it surrounds the middle clutch hub shaft 2.

The external air discharge hole 67 and the external air intake hole 66 of the front cover 60, as shown in FIG. 2, are disposed so that the locations of the outside part of the external air discharge hole 67 and the discharge opening 67a are offset axially outwards from the locations of the outside parts of the external air intake hole 66 and the intake opening 66a. This is done in order to prevent the abrasion dust that is discharged from the external air discharge hole 67 from being suctioned back in from the external air intake hole 66.

The operation of the device is described below. Operation of the hybrid drive power transmission system of the first embodiment is described below under the headings: "Slave cylinder clutch engagement/release operation" and "Abrasion dust discharge action resulting from air flow effects."

Slave Cylinder Clutch Engagement/Release Operation

The clutch engagement/release operation whereby the dry multi-plate clutch 7 is engaged and released by the slave cylinder 8 is described below with reference to FIG. 2.

When the dry multi-plate clutch 7 is engaged by the slave cylinder 8, the clutch hydraulic pressure generated by the transmission unit T/M is supplied to the cylinder oil chamber 86 through a first clutch hydraulic path 85 formed in the cylinder housing 81. The hydraulic force resulting from multiplication of the hydraulic pressure by the received pressure surface area that acts on the piston 82 opposes the bias force produced by the return spring 84 that is interposed between the piston arm 83 and the clutch drum 6, causing the piston 82 to undergo a stroke in the rightwards direction in FIG. 2. Thus, the engaging force resulting from the difference between the hydraulic force and the biasing force is transferred from the piston 82, to the needle bearing 87, to the piston arm 83, to the arm press-plate 88, which pushes on the drive plate 71 and the driven plate 72, thereby engaging the dry multi-plate clutch 7.

When the dry multi-plate clutch 7 that is in an engaged state is released, the hydraulic oil that is supplied to the cylinder oil chamber 86 passes through the clutch hydraulic path 85 and is extracted to the transmission unit T/M, causing a decrease in the hydraulic pressure acting on the piston 82. The urging force due to the return spring 84 thus supersedes the hydraulic force, and the arm press-plate 88 and the piston arm 83 that are integrally configured undergo a stoke in the leftward direction in FIG. 2. As a result, the engaging force that has been transferred to the arm press-plate 88 is released, and the dry multi-plate clutch 7 is released.

Abrasion Dust Discharge Action Resulting from Air Flow Effects

As described above, when engagement and release of the dry multi-plate clutch 7 is repeated, the surface of the friction facing material separates and falls away, producing abrasion dust that accumulates between the two clutch plates 71, 72. This abrasion dust must be externally discharged. The corresponding action of abrasion dust discharge resulting from air flow effects is described below with reference to FIG. 7.

When at least one of the clutch hub 3 and the clutch drum 6 rotates about the clutch rotational shaft CL, because the facing grooves 76 are present on the friction facing 73, a centrifugal fan effect is produced in which the clutch hub 3 having the friction facing 73 on both faces acts as a blade.

Figure 7:
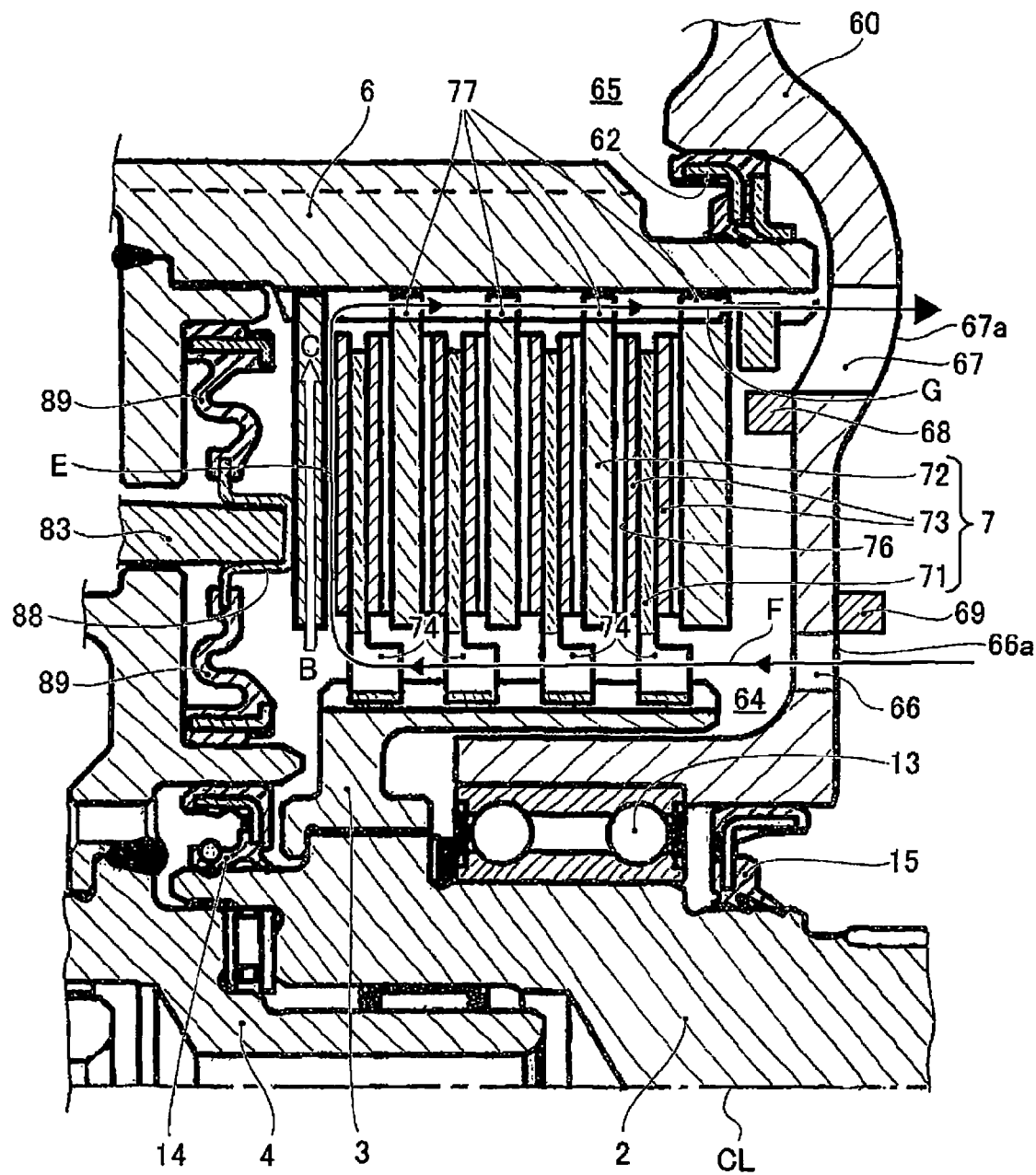
FIG. 7 is an illustrative diagram of the operation of the abrasion dust discharge in the hybrid drive power transmission system of the first embodiment.

As shown in FIG. 7, the centrifugal fan effect conveys air in the radial direction from the B region near the clutch hub 3 to the C region near the clutch drum 6, increasing the air pressure near the clutch drum 6 (positive pressure) and decreasing the air pressure near the clutch hub 3 (negative pressure). As a result of this air pressure differential, radial air flow E is generated whereby air moves in the radial direction from the clutch hub 3 to the clutch drum 6. Specifically, the pressure radially inward in the dry multi-plate clutch 7 is decreased relative to atmospheric pressure (negative pressure), and the pressure radially outward in the dry multi-plate clutch 7 is increased relative to atmospheric pressure (positive pressure), producing a pressure relationship in which the air pressure at a radially outward location in the clutch is greater than atmospheric pressure, which is greater than the air pressure at a radially inward location in the clutch.

As a result of the generation of this radial air flow, an air pressure differential is produced between external air that is at atmospheric pressure and air that is radially inwards in the clutch, which is at negative pressure. Consequently, as shown in FIG. 7, an axial air flow F that is radially inward is produced whereby external air that is taken in from the external air intake holes 66 passes through the air passage holes 74 towards the clutch hub 3 where the air pressure is decreased.

In addition, the splined joining part of the drive plate 72 has low air passage resistance due to the gap allowance that is provided to ensure plate movement. Moreover, the air passage resistance is additionally decreased, because there are air passage gaps 77 that allow air flow to move in the axial direction at the splined joining parts of the driven plate 72 and the clutch drum 6. Thus, as a result of generation of the air flow E in the radial direction, an air pressure differential is produced between a radially outward location in the clutch which is at positive pressure and external air which is at atmospheric pressure. Consequently, as shown in FIG. 7, the direction changes from the axial direction at a radially inward location to the radial direction, and the air flow that has entered near the clutch drum 6 passes from the air passage gaps 77 in the splined joining parts through the external air discharge hole 67, producing an axial air flow G at a radially outward location, which is then discharged to external air.

As a result of this air flow generation action, as indicated by the arrows in FIG. 7, an air flow (F→E→G) is generated that is delineated by the following flow line: external air→external air intake hole 66→axial gaps at radially inward locations in the clutch (e.g., air passage holes 74)→radial gaps of the clutch (e.g., facing grooves 76)→axial gaps at radially outward locations in the clutch (e.g., air passage gaps 77)→external air discharge hole 67→external air. In FIG. 7, only radial air flow E is described on the side closest to the piston, but a plurality of radial air flows E arise for the respective facing grooves 76. For this reason, the abrasion dust that has separated from the surface of the friction facing 73 due to repeated clutch separations moves by being carried in the air flow (F→E→G) and is discharged externally.

The effect of the invention is described below. With the hybrid drive power transmission system of the first embodiment, the effects listed below can be obtained.

(1) With a drive power transmission system in which a dry clutch (multi-plate clutch 7) that disconnects drive power transfer is disposed inside a sealed space (clutch chamber 64), the dry clutch (dry multi-plate clutch 7) comprises: a first clutch plate (drive plate 71) that is joined by splines to a clutch hub 3; a second clutch plate (driven plate 72) that is joined by splines to a clutch drum 6; a friction facing 73 that is provided on either the first clutch plate (drive plate 71) or second clutch plate (driven plate 72), with the friction surface pressing against the other plate face during clutch engagement; and a cover member (front cover 60) having an external air intake hole 66 that takes external air into the sealed space (clutch chamber 64) and an external air discharge hole 67 that discharges the air flow from inside the sealed space (clutch chamber 64) to external air; the external air intake hole 66 being provided on the cover member (front cover 60) that is disposed on a side face of the dry clutch (dry multi-plate clutch 7) so as to pass through in the axial direction at a radially inward location relative to the two clutch plates 71, 72, and the external air discharge hole 67 being provided on the cover member (front cover 60) that is disposed on a side face of the dry clutch (dry multi-plate clutch 7) so as to pass through in the axial direction at a radially outward location relative to the two clutch plates 71, 72 (FIGS. 2, 7). For this reason, abrasion dust that is generated between the clutch plates (drive plate 71, driven plate 72) that are pressed together with the friction facing 73 interposed is carried in an axial air flow and is discharged outwards.

(2) Air passage holes 74 that allow air flow to pass in the axial direction are provided in the first clutch plate (drive plate 71) at the splined joining parts with the clutch hub 3, and the radial location at which the external air intake hole 66 is provided is aligned with the radial location on the dry clutch (dry multi-plate clutch 7) at which the air passage holes 74 are provided (FIG. 7). For this reason, in addition to the effects described in (1) above, the air passage resistance and flow-line bending resistance of the axial air flow F at a radially inward location are suppressed, producing a smoother external air intake, while also increasing the flow rate of the axial air flow F at a radially inward location that exhibits the air flow effect of discharging abrasion dust.

(3) Air flow gaps 77 that allow passage of air flow in the axial direction are provided in the second clutch plate (driven plate 72) at the splined joined parts with the clutch drum 6, and the radial location at which the external air discharge hole 67 is provided aligns with the radial position on the dry clutch (dry multi-plate clutch 7) where the air passage gaps 77 are provided (FIG. 7). For this reason, in addition to the effects in (1) and (2) above, the air passage resistance and flow-line bending resistance of the axial air flow G at a radially outward location are suppressed, producing a smoother external air intake, while also increasing the flow rate of the axial air flow G at a radially outward location that exhibits the air flow effect of discharging abrasion dust.

(4) In the cover member (front cover 60), the locations of the discharge opening 67a and the outer part of the external air discharge hole 67 are offset outwards in the axial direction from the locations of the intake opening 66a and the outer part of the external air intake hole 66 (FIG. 2). For this reason, in addition to the effects of (1) to (3), abrasion dust that has been discharged from the external air discharge hole 67 can be prevented from being suctioned back in from the external air intake hole 66.

(5) A separator inner wall 68 (inner wall structure) that suppresses movement of air flow from the inside of the external air discharge hole 67 to the inside of the external air intake hole 66 is provided on the cover member (front cover 60) at an inner face location in the radial direction between the external air discharge hole 67 and the external air intake hole 66. For this reason, in addition to the effects of (1) to (4) above, movement of air flow from the inside of the external air discharge hole 67 to the inside of the external air intake hole 66 is suppressed, and abrasion dust that is carried in the air flow in the sealed space (clutch housing 64) towards the external air discharge hole 67 is prevented from returning to the external air intake hole 66. As a result, abrasion dust discharge effects from the external air discharge hole 67 are improved.

(6) a separator outer wall 69 (outer wall structure) that suppresses movement of air flow from the outside of the external air discharge hole 67 towards the outside of the external air intake hole 66 is provided on the cover member (front cover 60) at a location on the radially outer face between the external air discharge hole 67 and the external air intake hole 66. For this reason, in addition to the effects of (1) to (5), movement of air flow from the outside of the external air discharge hole 67 to the outside of the external air intake hole 66 is suppressed, and abrasion dust that has been discharged from the external air discharge hole 67 is prevented from returning again to the external air intake hole 66.

The drive power transmission system of the present invention was described above with reference to the first embodiment. However, the specific configuration is not restricted to that of the first embodiment, and various design modifications and additions are permissible while remaining within the spirit of the invention as described in the claims.

In the first embodiment, an example was presented in which a dry multi-plate clutch was used as the dry clutch. However, in another example, a single-plate dry clutch or the like may be used.

In the first embodiment, an example of a normal-open dry clutch was presented. However, in another example, the dry clutch may be a normal-closed dry clutch employing a diaphragm spring, or the like.

In the first embodiment, an example was presented in which the drive plate 71 was joined by splines to the clutch hub 3, and the driven plate 72 was joined by splines to the clutch drum 6. However, in another example, the drive plate may be joined by splines to the clutch drum, and the driven plate may be joined by splines to the clutch hub.

In the first embodiment, an example was presented in which the drive plate 71 had a friction facing 73. However, in another example, the driven plate may have the friction facing.

In the first embodiment, an example was presented in which air passage holes 74 and/or air-passage gaps 77, and/or facing grooves 76, and the like, were provided in order to ensure an air flow path in the dry multi-plate clutch 7. However, even if there are no air passage holes 74 and/or air passage gaps 77, the fitting gaps present in the splined joining parts may serve as axial air flow paths, and the gaps between the plates may serve as radial air flow paths. For this reason, it is not always necessary to provide air passage holes 74, and/or air passage gaps 77, and/or facing grooves 76, and the like.

Figure 8:
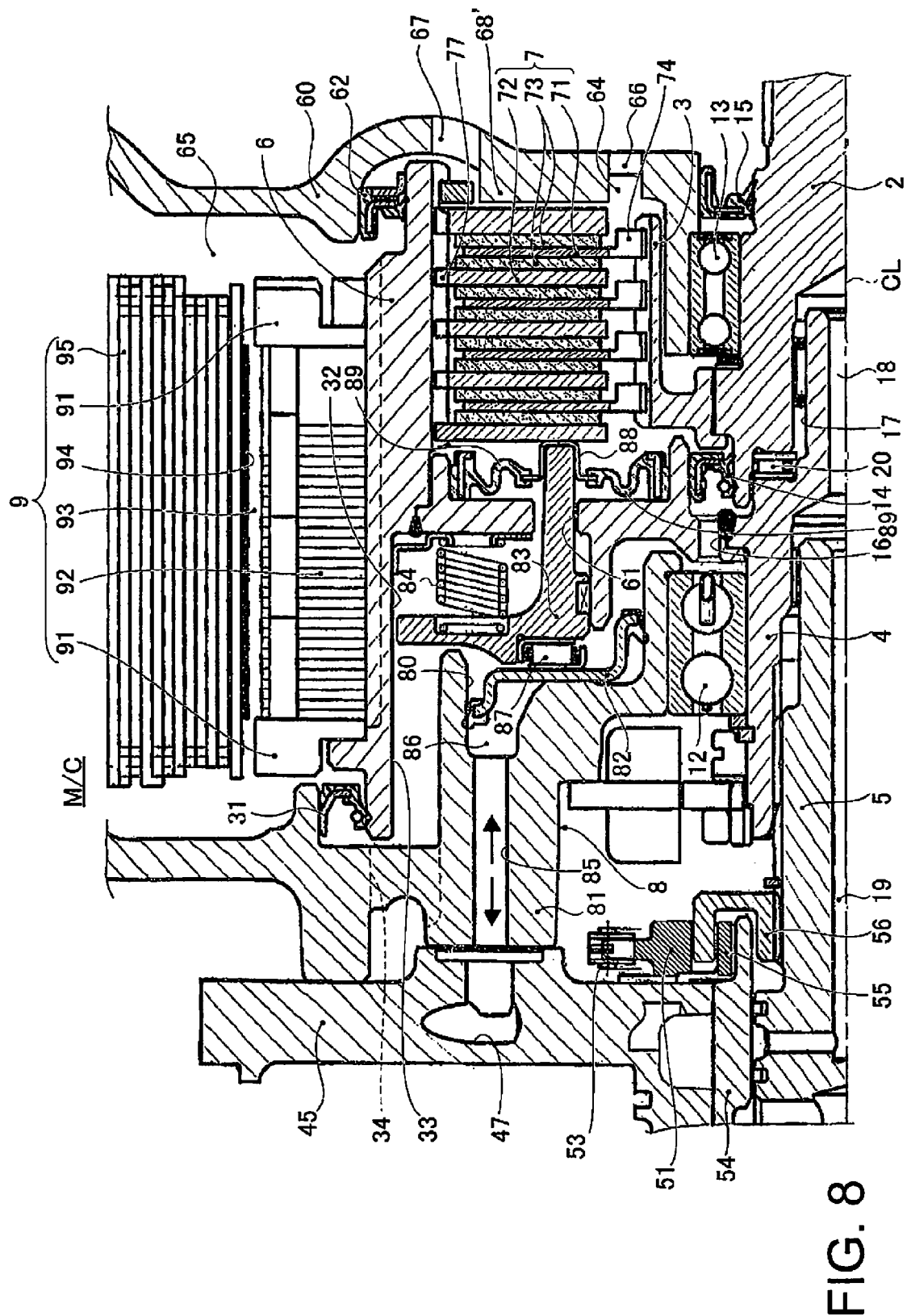
FIG. 8 is a cross-sectional view showing the configuration of the motor and clutch unit in the hybrid drive power transmission system having a rib-shaped inner wall structure.

In the first embodiment, an example was presented in which a separator inner wall 68 produced by a donut-shaped protrusion was used as an inner wall structure. However, for example, as shown in FIG. 8, the inner wall structure may be a rib-shaped inner wall 68' in which the wall thickness of the front cover 60 is increased on the inner face between the external air discharge hole 67 and the external air intake hole 66, and the axial gaps between the two clutch plates 71, 72 are narrowed. Similarly, the external wall structure may be a ring-shaped external wall, rather than a separator outer wall 69 produced as a donut-shaped protrusion. When the inner wall structure or outer wall structure is a rib-shaped member, the rigidity of the front cover 60 having the external air intake hole 66 and the external air discharge hole 67 can be increased.

In the first embodiment, a preferred example of a hybrid drive power transmission system was presented in which the engine and motor/generator were mounted, and the dry multi-plate clutch was a drive mode transition clutch. However, this is also suitable for engine drive power transmission systems in which only an engine is mounted as a drive source, and a dry clutch is used as a start clutch, as with engine automobiles. In addition, the invention also is suitable for use in motor drive power transmission systems in which only a motor/generator is mounted as a drive source, and a dry clutch is used as a start clutch, as with electric vehicles, fuel cell vehicles, and the like.

The invention claimed is:

1. A drive power transmission system comprising:
   a clutch hub;
   a clutch drum arranged with respect to the clutch hub to partially defining a sealed space; and
   a dry clutch configured to disconnect transmission of drive power, the dry clutch being disposed inside the sealed space, the dry clutch comprising:
   a first clutch plate that is joined by first splines to the clutch hub;
   a second clutch plate that is joined by second splines to the clutch drum;
   a friction facing that is provided on one of the first and second clutch plates to form a friction surface, the friction surface pressing against a surface of the other of the first and second clutch plates during clutch engagement; and
   a cover member arranged adjacent to a side face of the dry clutch and partially defining the sealed space, the cover member having an external air intake hole through which external air enters into the sealed space and an external air discharge hole through which the air flow exits from inside the sealed space to the external air,
   the external air intake hole passing through the cover member in an axial direction of the drive power transmission system, the external air intake hole being arranged to open toward a radially inward portion of the dry clutch,
   the external air discharge hole being arranged farther outward in a radial direction of the dry clutch than the external air intake hole such that the external air discharge hole opens toward a radially outward portion of the dry clutch, and the external air discharge hole being arranged such that a radially innermost edge of the external air discharge hole is disposed farther inward radially than an internal circumferential surface of the clutch drum,
   the external air intake hole and the external air intake hole of the cover member being positioned with respect to the clutch hub and the clutch drum such that, due to rotation of at least one of the clutch hub and the clutch drum, an air flow is generated in an axial direction in which external air is drawn through the external air intake hole along the clutch hub to a radially inward location of reduced air pressure adjacent the clutch hub, then the air flow is directed radially outward to a radially outward location of increased air pressure adjacent the clutch drum, and then the air flow is directed along the clutch drum and passes through the external air discharge hole to the external air.

2. The drive power transmission system according to claim 1, wherein
the first clutch plate is provided with an air passage hole through which the air flow passes in the axial direction where the first clutch plate is joined by the first splines to the clutch hub, and
the external air intake hole of the cover member is provided at a radial location that is aligned with a radial location of the air passage hole of the first clutch plate.

3. The drive power transmission system to claim 2, wherein
the second clutch plate is provided with an air flow gap through which air flow can pass in the axial direction where the second clutch plate is joined by the second splines to the clutch drum, and
the external air discharge hole of the cover member is provided at a radial location that is aligned with a radial position of the air passage gap of the second clutch plate.

4. The drive power transmission system to claim 2, wherein
the cover member is disposed so that an outer discharge opening of the external air discharge hole is offset outwards in the axial direction from an outer intake opening of the external air intake hole.

5. The drive power transmission system to claim 2, wherein
the cover member includes an inner wall structure provided on an internal wall surface of the cover member at a position radially between the external air discharge hole and the external air intake hole for suppressing air from flowing along inside of the cover member from the external air discharge hole to the external air intake hole.

6. The drive power transmission system to claim 2, wherein
the cover member includes an outer wall structure provided on an external wall surface of the cover member at a position radially between the external air discharge hole and the external air intake hole for suppressing air from flowing along the cover member from outside of the external air discharge hole towards the outside of the external air intake hole.

7. The drive power transmission system according to claim 1, wherein
the cover member is disposed so that an outer discharge opening of the external air discharge hole is offset outwards in the axial direction from an outer intake opening of the external air intake hole.

8. The drive power transmission system to claim 7, wherein
the cover member includes an inner wall structure provided on an internal wall surface of the cover member at a position radially between the external air discharge hole and the external air intake hole for suppressing air from flowing along inside of the cover member from the external air discharge hole to the external air intake hole.

9. The drive power transmission system to claim 7, wherein
the cover member includes an outer wall structure provided on an external wall surface of the cover member at a position radially between the external air discharge hole and the external air intake hole for suppressing air from flowing along the cover member from outside of the external air discharge hole towards the outside of the external air intake hole.

10. The drive power transmission system according to claim 1, wherein
the cover member includes an inner wall structure provided on an internal wall surface of the cover member at a position radially between the external air discharge hole and the external air intake hole for suppressing air from flowing along inside of the cover member from the external air discharge hole to the external air intake hole.

11. The drive power transmission system to claim 10, wherein
the cover member includes an outer wall structure provided on an external wall surface of the cover member at a position radially between the external air discharge hole and the external air intake hole for suppressing air from flowing along the cover member from outside of the external air discharge hole towards the outside of the external air intake hole.

12. The drive power transmission system according to claim 1, wherein
the cover member includes an outer wall structure provided on an external wall surface of the cover member at a position radially between the external air discharge hole and the external air intake hole for suppressing air from flowing along the cover member from outside of the external air discharge hole towards the outside of the external air intake hole.

13. A drive power transmission system comprising:
a clutch hub;
a clutch drum arranged with respect to the clutch hub to partially defining a sealed space; and
a dry clutch configured to disconnect transmission of drive power, the dry clutch being disposed inside the sealed space, the dry clutch comprising:
a first clutch plate that is joined by first splines to the clutch hub;
a second clutch plate that is joined by second splines to the clutch drum;
a friction facing that is provided on one of the first and second clutch plates to form a friction surface, the friction surface pressing against a surface of the other of the first and second clutch plates during clutch engagement; and
a cover member arranged adjacent to a side face of the dry clutch and partially defining the sealed space, the cover member having an external air intake hole through which external air enters into the sealed space and an external air discharge hole through which the air flow exits from inside the sealed space to the external air,
the external air intake hole passing through the cover member in an axial direction of the drive power transmission system, the external air intake hole being arranged to open toward a radially inward portion of the dry clutch,
the external air discharge hole passing through the cover member in the axial direction, the external air discharge hole being arranged farther outward in a radial direction of the dry clutch than the external air intake hole such that the external air discharge hole opens toward a radially outward portion of the dry clutch,
the external air intake hole and the external air intake hole of the cover member being positioned with respect to the clutch hub and the clutch drum such that, due to rotation of at least one of the clutch hub and the clutch drum, an air flow is generated in an axial direction in which external air is drawn through the external air intake hole along the clutch hub to a radially inward location of reduced air pressure adjacent the clutch hub, then the air flow is directed radially outward to a radially outward location of increased air pressure adjacent the clutch drum, and then the air flow is directed along the clutch drum and passes through the external air discharge hole to the external air,
the second clutch plate being provided with an air flow gap through which the air flow can pass in the axial direction where the second clutch plate is joined by the second splines to the clutch drum, and the external air discharge hole of the cover member is provided at a radial location that is aligned with a radial position of the air passage gap of the second clutch plate.

14. The drive power transmission system to claim 13, wherein
the cover member is disposed so that an outer discharge opening of the external air discharge hole is offset outwards in the axial direction from an outer intake opening of the external air intake hole.

15. The drive power transmission system to claim 13, wherein
the cover member includes an inner wall structure provided on an internal wall surface of the cover member at a position radially between the external air discharge hole and the external air intake hole for suppressing air from flowing along inside of the cover member from the external air discharge hole to the external air intake hole.

16. The drive power transmission system to claim 13, wherein
the cover member includes an outer wall structure provided on an external wall surface of the cover member at a position radially between the external air discharge hole and the external air intake hole for suppressing air from flowing along the cover member from outside of the external air discharge hole towards the outside of the external air intake hole.

* * * * *